Feb. 22, 1938.　　　G. W. BORTON　　　2,108,793
CRUSHING MACHINERY
Original Filed Feb. 3, 1931　　　4 Sheets-Sheet 2

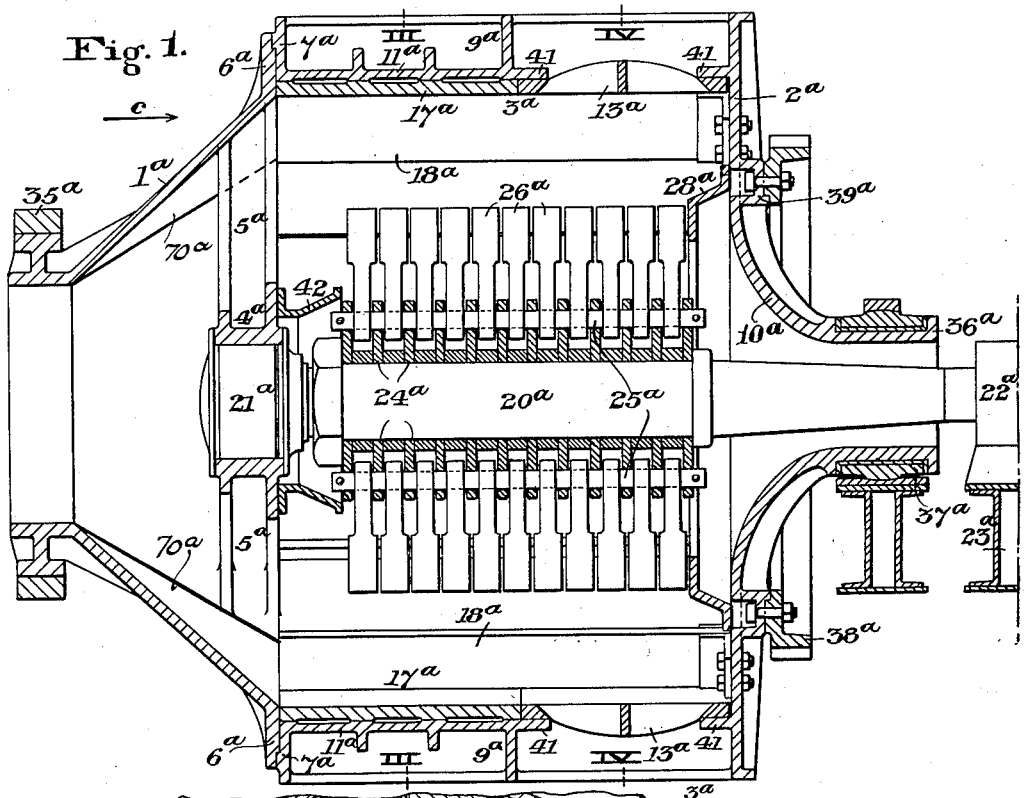

Fig. 4ª

Inventor:
GEORGE W. BORTON,
by
Atty

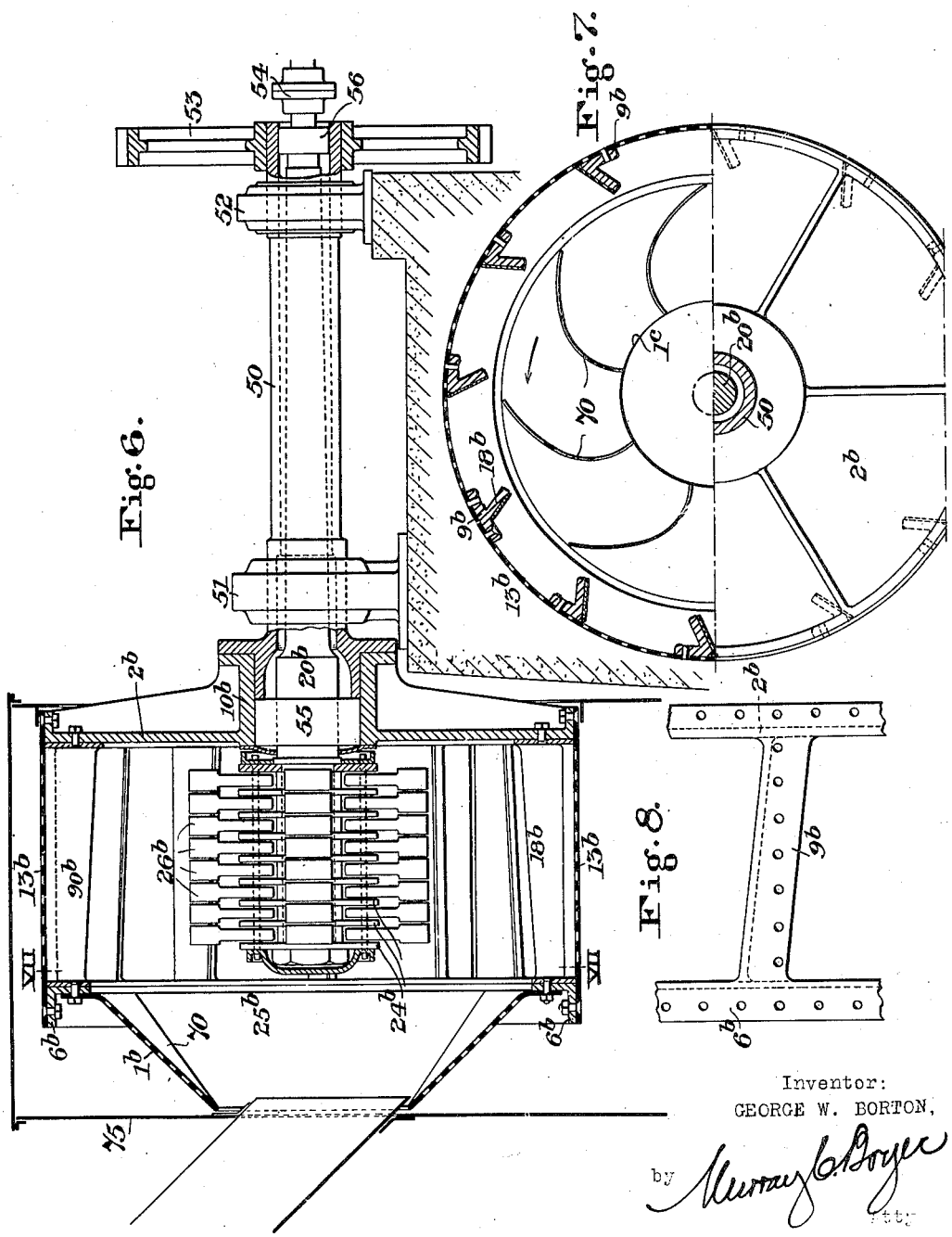

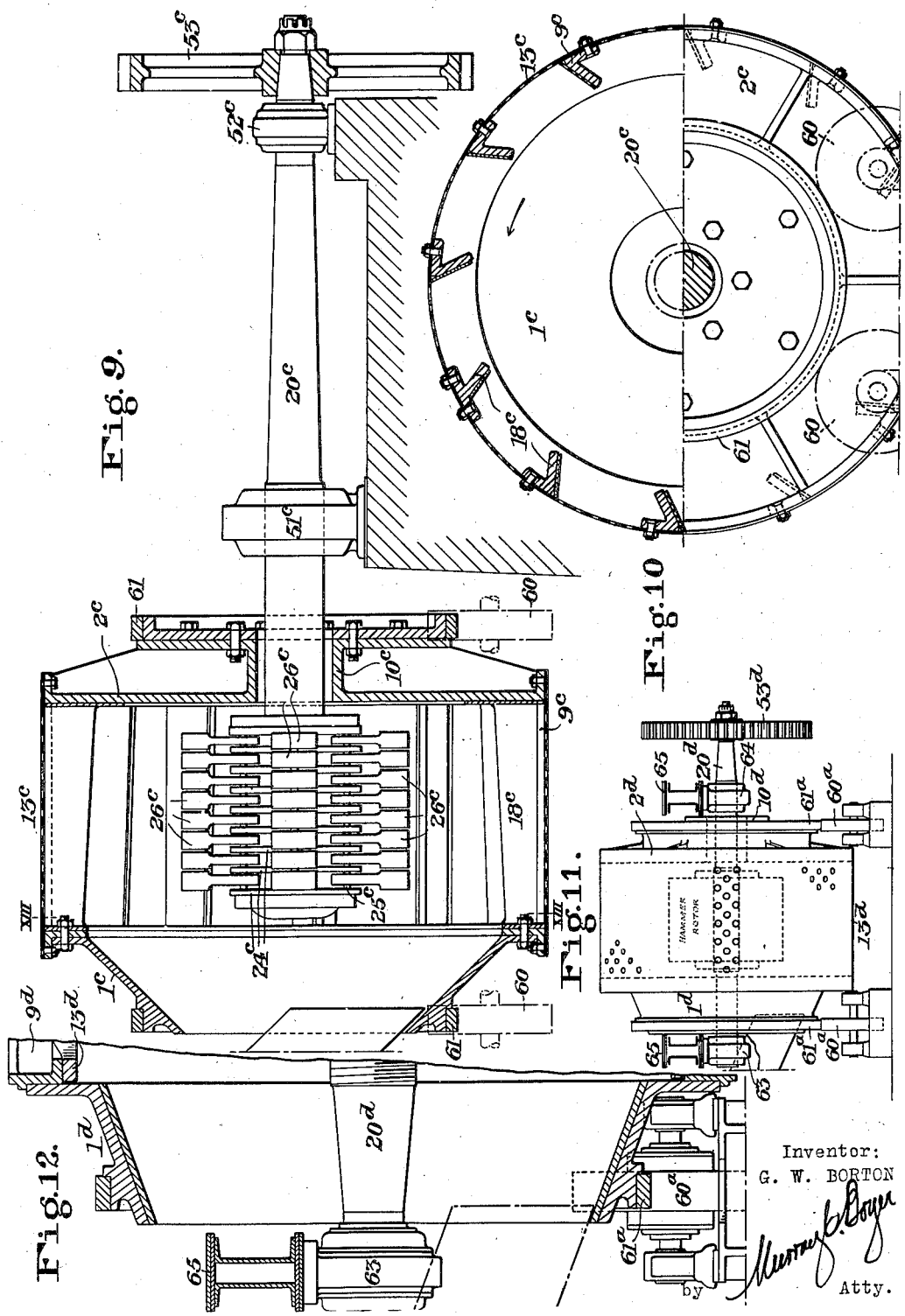

Patented Feb. 22, 1938

2,108,793

UNITED STATES PATENT OFFICE 2,108,793

CRUSHING MACHINERY

George W. Borton, New Lisbon, N. J., assignor to Pennsylvania Crusher Company, Philadelphia, Pa., a corporation of New York Original application February 3, 1931, Serial No. 513,190. Divided and this application February 26, 1934, Serial No. 713,045

4 Claims. (Cl. 83—11)

My present invention relates to apparatus for breaking, crushing, or comminuting various materials such as ore, rock, coal, and/or the like, and is a division of my application for patent filed February 3, 1931, Serial No. 513,190 (now Patent No. 1,948,504, dated Feb. 27, 1934).

My invention comprises improved apparatus well adapted for the free reception of material to be crushed or broken, which may be run-of-mine or other size initially, and it includes a rotatable drum which may be of relatively large diameter having circular or annular end members or frames which may be of special conformation, and a peripheral wall disposed between said end frames. The peripheral wall may be partially or wholly apertured for the discharge of the broken material, and for such purpose, this wall may include screen sections of suitable character. These screen sections may be apertured plates of any usual type, and/or they may be in the form of integral frames with spaced bars, which bars may be arranged circumferentially of the wall of the drum or parallel with the longitudinal axis thereof, as may be necessary or desirable in connection with the particular material being crushed. The screen plates or the grids are supported by longitudinal members forming parts of the drum structure, and these longitudinal members may be integral with one or both of the end members or frames making up the drum, or they may be in the form of structural members such as I- or T-beams, connecting said end frames or members and holding the same in spaced relation. One of the end frames or members may have the shape of the frustrum of a cone in longitudinal section and serve as the chute or hopper for the delivery of material to the crushing chamber, and both end frames or members may be provided with trunnions or other suitable supports whereby the drum may be mounted for rotation. With this drum I employ a hammer-carrying rotor structure, and one of the end frames or members may be provided with a support receiving a bearing for the shaft carrying such rotor structure, or I may support the rotor structure entirely independently of the drum. The rotor structure may rotate in the same direction as the drum, but at a much greater speed.

In addition, the crushing chamber provided by the drum is equipped with lifting shelves, which may be adjustably mounted, whereby material delivered to such crushing chamber, preferably through the cone-shaped receiving end, may be continually lifted and dropped in the path of the hammers for impact thereby until broken to a size that will freely pass through the screen plates or the spaces between the bars of the grid section when the latter are employed. The lifting shelves may be mounted for angular adjustment longitudinally and radially of the drum.

A further object of my invention is to provide a structure of the general type referred to, with outboard shafts supporting the drum and the hammer-carrying rotor disposed within the same, one of said shafts being hollow and carrying bearings for the other shaft, and both drum and rotor being mounted for rotation in space at the ends of the respective shafts.

A further object of my invention is to provide means within the crushing chamber provided by the drum for entrapping, collecting, and/or discharging foreign material, tramp iron and the like, accompanying the material undergoing crushing.

And a still further object of my invention is to provide means for moving such foreign material, tramp iron, and/or the like, into an annular space at the end of the drum opposite the receiving end thereof.

These and other features of my invention are more fully disclosed hereinafter, reference being had to the accompanying drawings, more or less diagrammatic in character, in which:

Fig. 1 is a longitudinal sectional elevation illustrating one form of crushing structure within the scope of my invention.

Figs. 3 and 4 are cross-sectional views on the lines III—III and IV—IV, Fig. 1, respectively, the latter view being on a slightly larger scale, and both views looking in the direction of the arrow c.

Fig. 4a is a fragmentary perspective view illustrating a detail of my invention.

Fig. 6 is a longitudinal sectional view of another form of structure within the scope of my invention, showing an overhung hammer-carrying rotor disposed within the rotating drum or breaker cylinder.

Fig. 7 is a cross-sectional view on the line VII—VII, Fig. 6.

Fig. 8 is a fragmentary view illustrating another detail within the scope of my invention.

Fig. 9 is a longitudinal sectional elevation of another form of structure, wherein the drum is supported entirely independently of the hammer-carrying rotor and its operating means.

Fig. 10 is an end elevation of the structure shown in Fig. 9, partly in section, on the line X—X.

Fig. 11 is a view in elevation of another form of structure within the scope of my invention, and Fig. 12 is a longitudinal section of the feed end of a structure such as that shown in Fig. 11.

My improved crushing apparatus comprises a rotatable drum, with openings in the peripheral wall for discharge of the crushed material, and end frames or members connected thereto and provided with supporting means mounted in suitable bearings so that such drum may be freely rotated. In some instances, the screen supporting portions of the peripheral wall of the drum may be integral with one or both of the end frames, and in other instances, the end frames may be connected by longitudinal beams which, in turn, support the screen plates or grids. In most instances, the longitudinal connections will provide spaces arranged circumferentially of the drum and adapted for the reception of screen plates or grids made up of spaced bars, through which the material, when broken to the desired size, may be discharged.

Figure 4:
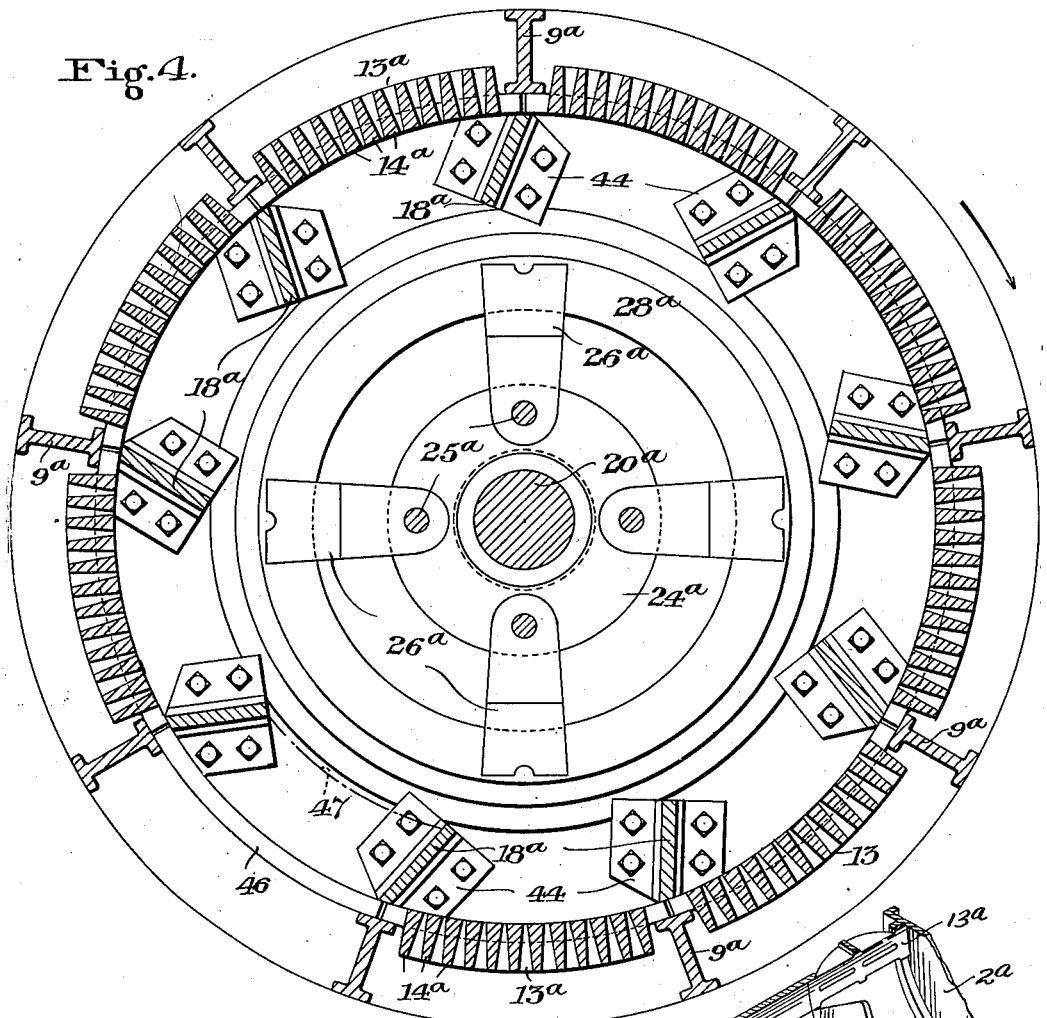

In Figs. 1, 3, and 4, I have shown one form of structure embodying my present invention. This structure may include a cone-shaped feed end 1ª with a wall or circular frame 2ª at the opposite end of the drum, the latter being integral with a peripheral wall portion 3ª. This peripheral wall portion may be provided with longitudinal ribs 9ª between the end wall or frame 2ª and an imperforate section of such peripheral wall portion which includes a flange 7ª at the opposite end thereof, connected to the flange 6ª of the cone-shaped member or frame 1ª. The peripheral wall includes a relatively imperforate section 11ª disposed toward the feed section 1ª, between which and the end wall or frame 2ª the longitudinal ribs 9ª extend, such ribs being spaced circumferentially of the peripheral wall of the drum and providing spaces or openings for the reception of screen members or grids 13ª. These screen members or grids 13ª may have deep V-shaped bars 14ª disposed in spaced relation and providing slots through which the broken material may be discharged, the bars of said grids 13ª being arranged longitudinally of the drum or parallel with the axis thereof. The substantially imperforate section 11ª may be of greater extent than the grids, and it may be provided with suitable wear plates or liners 17ª. It will be understood, however, that such portion 11ª may be apertured, if desired, the liners 17ª being provided with apertures also, preferably aligning with those of the wall 11ª when the latter is apertured. The peripheral wall portion providing the openings between the ribs 9ª receiving screen plates, or the grids 13ª, may have end flanges 41 arranged circumferentially of the drum and comprising part of said peripheral wall, and the screen plates or grids may be bolted or otherwise secured to these flanges.

Centrally of the drum, a shaft 20ª is mounted, such shaft passing through the hub 10ª of the end wall 2ª, and being preferably journaled in roller bearings 21ª and 22ª. The bearing 21ª is mounted in the hub 4ª carrying the spider arms 5ª, while the bearing 22ª is arranged externally of the apparatus and may be carried by a suitable support 23ª. The bearings 21ª and 22ª should be in axial alignment with the drum so that, while the latter is rotating, the bearing 21ª may function properly. The shaft 20ª supports a rotor structure of usual hammermill type, which may comprise spaced disks 24ª, supporting rods 25ª, and hammers 26ª hung from such supporting rods. The shaft 20ª may be driven by suitable means (not shown), which may be connected to the end of the shaft beyond the bearing 22ª. It will be understood that I may employ a rotor structure having rigidly mounted hammers, without departing from my invention. The end wall 2ª preferably carries a shield 28ª to prevent material broken by hammer impact or otherwise falling upon the shaft 20ª, and the bearing 21ª may be protected by a shell or cover 42.

The cone-shaped end frame or member 1ª may be provided with a bearing ring 35ª, which may be suitably supported, and the end wall or frame 2 may have its hub 10ª extended in the form of a trunnion 36ª, which may be mounted in a bearing 37ª. The drum may be rotatably driven by suitable gearing and a gear wheel 38ª may be mounted on lugs or bosses 39ª formed on or carried by the end wall 2ª. Such gear wheel may be driven by a pinion (not shown) operatively connected to a prime mover of suitable character. The driving means for the drum may be independent of the means driving the hammer rotor, or a single motor, properly geared, may be employed to drive the drum as well as the hammer rotor. The hammer rotor is preferably rotated in the same direction as the drum, but at a much greater speed. It will be understood, of course, that the hammer rotor may be driven in the direction opposite to that of the drum if such arrangement is desirable, without departing from my invention.

Figure 2:
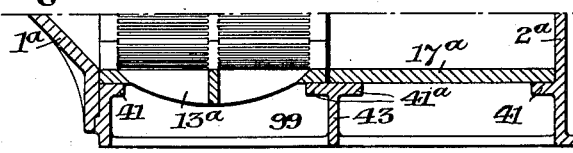
Fig. 2 is a fragmentary sectional view illustrating a modification within the scope of my invention.

As illustrated in Fig. 1, the peripheral wall of the drum includes the imperforate section 11ª as an integral part of the longitudinally disposed circumferentially spaced members 9ª supporting the grids 13ª, the latter being disposed to the right of the drum, as illustrated in the drawings, adjacent to the end wall 2ª. In Fig. 2, I have shown a modified construction or arrangement in which longitudinal members 99 extend substantially the full length of the drum with an intermediate annular rib 43 carrying supporting flanges 41ª connecting the same, such arrangement presenting two series of circumferentially disposed openings between such rib 43 and the ends of the drum. With such construction, it is possible to arrange the grids 13ª at either end of the drum toward the cone-shaped feed end 1ª, for instance, instead of toward the delivery end, and to provide a liner, such as 17ª, (imperforate or not as may be desired), over the other circumferentially disposed spaces or openings.

While I have referred to the portion 11ª of the peripheral wall of the drum as being substantially imperforate, it will be understood that such portion of the wall, as well as the wear liners or plates mounted thereon may be apertured for the discharge of material broken within the drum, or the fines accompanying such material and delivered thereto through the cone-shaped feed end. In like manner, the wall of the cone-shaped feed may be apertured so that the finer portions of the material not requiring crushing may pass therethrough before entering the crushing chamber of the drum.

In the structure illustrated in Figs. 1, 3, and 4, I show lifting shelves 18ª inclined with respect to radial planes passing through the axis of rotation. These shelves may be carried by the end walls or frames 1ª and 2ª, independently of the peripheral wall of the drum, the liners, and/or the screens or grids mounted in such peripheral wall, and supporting brackets 44 may be provided therefor. While in general practice, the lifting shelves will be fixed with respect to the peripheral wall of the drum when the desired angle is developed, I may arrange them for adjustment with respect to said wall in order that the discharge therefrom may be properly directed to the hammer zone, and for this purpose the shelves may be carried by angle sections 45, arranged to be rotatively movable with respect to the end walls of the drum, as clearly indicated in Fig. 5, so that the desired angle of the lifting shelves may be readily secured and maintained. In this arrangement, I have shown nine lifting shelves, each one being supported by one of the longitudinal ribs 9ª of the drum. This arrangement may be modified, however, and I may employ a greater or less number of lifting shelves without departing from my invention. It will be understood that I may employ the number of shelves necessary to effect such lifting of the material as will insure proper delivery to the hammers for economic reduction, a condition closely related to the volume of feed and the length of the crushing chamber, as well as the speed of the drum carrying the shelves and the speed of the hammers which act upon the falling material. It is desirable that the discharge of broken material from the drum should be such that substantially no unbroken material backs up against the end wall 2ª.

The speed at which the drum rotates is a factor in its successful operation, and this factor also determines the height to which the shelves will carry the material. It may be desirable to carry certain material to a different height than other materials in order to secure the desired reduction effected by the impact of the rotating hammers, the essential point being to carry the material to a height whereby it will fall from the shelves into the hammer zone at the proper point to insure the desired reduction; such hammers hurling the material tangentially against the inner wall of the drum at one point of engagement, and such material rebounding from the wall of the drum at another angle and dropping into the hammer zone for further reduction, which cycle of operation will be repeated until the desired comminution has been effected. For this reason, the use of adjustable shelves is highly desirable.

For the purpose of discharging foreign material, tramp iron, and/or the like which may collect in the drum of the structure illustrated in Figs. 1, 3, and 4, I may omit one of the screens or grids 13ª, or a portion of the same as indicated in Figs. 4 and 4a, leaving an opening 46, through which such material may discharge. As this open space will be at the bottom of the drum once for each revolution, a dam 47 is preferably provided between it and the feed end of the drum so that the entering material will have no tendency to cascade through said opening 46 before being picked up by the lifting shelves as the drum rotates. Or I may arrange one or more of the grids to be opened so as to permit removal of such foreign material.

The structure illustrated in Figs. 6, 7, et seq., comprises a rotating cage or drum in overhung position carried by an out-board shaft with a hammer-carrying rotor structure disposed within the drum. In this arrangement, the cage is carried by a sleeve shaft suitably supported in bearings, while the hammer-carrying rotor is supported at the end of a shaft centrally disposed with respect to the sleeve shaft carrying the drum. The overhung weight of the drum, as well as the weight of the rotor structure, is partially compensated for by the weight of the respective shafts and the weight of a gear wheel carried by the end of the sleeve shaft and through which motion is imparted thereto.

Figure 5:
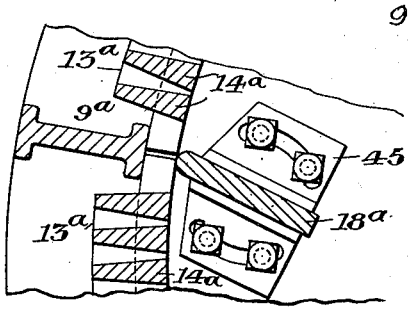
Fig. 5 is a fragmentary view on a slightly larger scale of a modified detail of my invention.

This form of my improved crushing structure may comprise a drum having a conical feed end 1ᵇ substantially like those illustrated in Figs. 1 and 5, and an imperforate end wall 2ᵇ. The conical feed end may be apertured for the passage of fines accompanying the material being crushed. These parts may be connected together in spaced relation by longitudinal members 9ᵇ, which may be integral with the end wall 2ᵇ, or such elements may be independent members 90ᵇ, as indicated in Fig. 6, secured to the end walls or members 2ᵇ and 6ᵇ by suitable bolts. This form of structure is shown as provided with screen plates 13ᵇ, and these screen plates may be of the type illustrated in the patent of John H. Doerres, No. 1,563,173, or of any other type commonly employed in coal breakers of the Bradford type. Grids of the type illustrated in Figs. 1, 2, and 4 may be employed in lieu of such screen plates.

Lifting shelves 18ᵇ of the fixed or adjustable type may be employed in the form of crushing apparatus shown in Fig. 6 or, if desired, the webs of the longitudinal members 9ᵇ may serve as lifting shelves, as illustrated in Fig. 7.

When the end sections or members 2ᵇ and 6ᵇ are integral with the longitudinal members 9ᵇ, the latter may be arranged at an angle to the longitudinal axis of the drum, as clearly indicated in Fig. 8, which also indicates lifting shelves as integral with said longitudinal members.

The end wall or frame 2ᵇ carries a central hub 10ᵇ attached to a hollow shaft 50, the latter extending outwardly some distance away from said wall 2ᵇ, and being supported by bearings 51 and 52. A gear wheel 53 is carried by the end of this hollow shaft, and motion may be imparted thereto through the medium of a pinion on a driving shaft (not shown), or such gear wheel may be driven in any other manner. The hammer-carrying rotor structure may be of the type illustrated in Fig. 1, having hammers of any suitable or usual type, indicated at 26ᵇ, hung from supporting rods 25ᵇ, carried by the usual spaced disks 24ᵇ.

The rotor structure shown in Figs. 6 and 7 is carried by a shaft 20ᵇ which passes through the hollow shaft 50 and may be connected at its outer end by a coupling 54 to any suitable form of motor or other driving mechanism. The hub 10ᵇ of the wall 2ᵇ of the drum carries a roller bearing 55 (or bearing of other suitable type) for the shaft 20ᵇ, and a bearing 56 of suitable or similar type is disposed near the extreme outer end of the hollow shaft. Both of these shafts are in motion at the same time, the inner shaft being driven at a much greater speed than the outer hollow shaft, and they may move in the same direction, or in opposite directions, as may be best adapted for the particular crushing work in hand. As may be readily understood, the shafts 20ᵇ and 50 may be driven by a single source of power.

In Figs. 9 and 10, I have shown a form of structure somewhat similar to that illustrated in Figs. 6 and 7, in which the drum is mounted entirely independently of the hammer rotor and its shaft. While various forms of mounting may be employed, more or less common in the mounting of the drum or shells of Bradford breakers, in the present instance the end sections 1c and 2c of the drum are shown as supported by rollers 60 forming a cradle; the drum having annular portions 61 engaging the same. These rollers may be driven by suitable means to impart the desired motion to the drum, and such rollers may be toothed and the annular portions 61 of the drum may also be toothed for driving engagement therewith or, in lieu of this, the rollers 60 may be idlers and the drum may carry a gear wheel driven by suitable means, which may include a power transmitting pinion meshing with such gear. In this arrangement, the rotor, consisting of the usual disks 24c, and the hammers 26c hung from rods 25c carried by such disks in the usual manner, may be carried by an overhung shaft 20c, mounted in bearings 51c and 52c, the end of such shaft carrying a gear 53c to which motion may be imparted by suitable means, through a power transmitting pinion meshing with such gear, or otherwise. In this arrangement, there is no contact of the hammer rotor and its operating mechanism with the drum; the open hub 10c of the end wall 2c providing for the free passage of the shaft 20c. The drum and rotor may be independently driven in the same or opposite directions, as may be necessary or desirable, and at different speeds. The speed of the drum, of course, will be less than the speed of the hammer rotor. As in the other structures, the drum will have lifting shelves 18c of suitable character, and they may be integral with the longitudinal members 9c connecting the end members, or they may be independent members secured to such longitudinal members. In like manner, such longitudinal members may be integral with one or both of the end members, or they may be independent elements of I- or T-cross-section, to which said end members are secured.

In Fig. 11, I have shown another form of structure in which the hammer-carrying rotor is supported independently of the drum. In this construction, the drum is shown as supported by rollers 60a, engaging the annular portion 61a, in a manner substantially similar to the structure illustrated in Figs. 9 and 10, so as to be capable of movement independently of the hammer-carrying rotor structure, which is supported by a shaft 20d, and the latter is carried by or journaled in suspended bearings 63 and 64 which may be hung from structural supports 65, or other means disposed externally of and at the opposite ends of the drum. The drum may be of the same type as those illustrated in Figs. 6 and 9, or like that illustrated in Fig. 1.

In this arrangement, there is no contact of the hammer-carrying rotor and its operating mechanism with the drum, the end wall 2d having a hub 10d providing for the free passage of the shaft 20d, while the opposite end of said shaft passes through the opening in the cone-shaped feed member 1d. The shaft 20d may carry a gear wheel 53d to which motion may be imparted in any suitable manner whereby the hammer-carrying rotor may be driven. As in the other structures, the drum and rotor may be independently driven in the same or opposite directions, as may be necessary or desirable. The speed of the drum, of course, will be less than the speed of the hammer-carrying rotor. As in the other structures, the drum will have lifting shelves, and they may be of the type illustrated in Figs. 7 and 10, or of the type illustrated in Fig. 8.

In lieu of supporting the drum by means of the rollers 60 or 60a, engaging rings 61 or 61a carried by the drum, in structures of the type illustrated in Figs. 11 and 12, I may arrange suspended bearing supports for the drum, of a character substantially similar to those illustrated at 63 and 64, the drum having hollow trunnions journaled in said suspended bearings. The shaft carrying the hammer rotor may pass through these trunnions, and this shaft may be journaled in bearings disposed within the trunnions, or such shaft may be extended beyond the bearings supporting said trunnions and hung in independent suspended bearings. Any usual form of driving means may be employed to rotate the drum, and the hammer-carrying rotor may be independently driven by suitable means.

In the structure illustrated in Figs. 6 and 7, I have shown the cone-shaped feed end member provided with vanes, indicated at 70. While in some instances, these vanes may be straight, that is to say, parallel with the axis of rotation, they are preferably curved, as illustrated in Fig. 7. Their purpose is to prevent material from cascading directly into the bottom of the drum and avoid the formation of a bed of uncrushed material that would retard free screening of the material broken by the hammers. The vanes serve to divide the feed and elevate it partway during rotation of the drum. I may also provide vanes 70a in the cone-shaped feed member illustrated in Fig. 1 to divert the flow of material from contacting with the arms 5a, forming the spider supporting the bearing 21a.

While I have illustrated and referred more or less particularly to a drum having a foraminous wall, it will be understood that, in some instances, the wall of the drum may be imperforate, or portions thereof may be imperforate, as illustrated in Fig. 1 of the drawings. When imperforate drums are employed, the material broken by the hammers may be carried to the end of the same and discharged through openings disposed circumferentially of the drum at or adjacent the end opposite the feed end. Delivery of the material to such end may be effected by means of inclined lifting shelves of the type illustrated in Fig. 8.

The rotating drum, illustrated in Fig. 6, may be enclosed in a casing or housing 75 as indicated therein, although it will be understood that such casing is not essential for the successful operation of this particular form of my improved crushing apparatus. And, if desired, all forms of the crushing structures illustrated may be enclosed in casings or housings of the same character as that illustrated in Fig. 6.

From the foregoing description, it will be apparent that simple and efficient means are provided for accomplishing the objects of the invention, and while the elements shown and described are well adapted to serve the purposes for which they are intended, it is to be understood that the invention is not limited to the precise constructions set forth, but includes within its scope such changes and modifications as may be made within the terms of the appended claims.

I claim:

1. In a crushing structure, the combination of a cylindrical drum mounted for rotation on a substantially horizontal axis and having a peripheral wall with foraminous and imperforate portions each of said portions occupying substantially one-half of the longitudinal extent of the drum; said imperforate wall portion forming a crushing zone at one end of the drum and the foraminous wall portion forming a combined crushing and screening zone at the other end of the drum, a centrally apertured wall section integral with the peripheral wall and forming one end of the drum adjacent to the foraminous portion thereof; said end wall section including a hollow, outwardly-extending portion forming a trunnion, a centrally apertured cone-shaped feed section providing a trunnion connected to the imperforate portion of said peripheral wall; said feed section including a plurality of radial arms disposed toward the drum with a hub axially arranged with respect thereto, supports for said trunnions, means for rotating said drum, lifting shelves extending the full length of said drum internally of the same whereby material introduced therein may be immediately lifted for gravitational discharge, rotatable hammer mechanism adapted to act upon the material spilling from said lifting shelves, a shaft for said hammer mechanism extending thru the hollow trunnion of the end wall, bearing supports for said shaft; one of said supports being carried by the hub of the feed section and the other support being disposed externally of the drum beyond the trunnion of the end wall section, and means for driving the hammer mechanism independently of the means for rotating the drum.

2. In a crushing structure, the combination of a cylindrical drum having a peripheral wall including an imperforate portion and a foraminous portion; each of said portions occupying substantially one-half of the longitudinal extent of the drum, means for rotating said drum, longitudinally extending ribs connecting said peripheral wall portions, an end wall section integral with said peripheral wall and including an outwardly extending hollow trunnion, a cone-shaped section having a central feed opening connected to the imperforate wall portion of said drum and providing a trunnion, supports for said trunnions, vanes carried by the cone-shaped feed section; said feed section having a plurality of radial arms disposed toward the drum with a hub axially arranged with respect thereto, a series of longitudinally disposed removably mounted grid bars partially closing the foraminous portion of said drum, lifting shelves extending the full length of the drum internally of the same whereby material introduced therein may be lifted for gravitational discharge, rotatable hammer mechanism adapted to act upon the material spilling from said lifting shelves, a shaft for said hammer mechanism extending through the hollow trunnion of the end wall, bearing supports for said shaft; one of said supports being carried by the hub of the feed section and the other support being disposed externally of the drum beyond the trunnion of the end wall, and means for driving the hammer mechanism independently of the means for rotating the drum.

3. In a crushing structure, the combination of a cylindrical drum comprising a peripheral wall with foraminous and imperforate portions and an integral end wall adjacent the foraminous portion; each of said portions occupying substantially one-half of the longitudinal extent of the drum and said end wall having a central opening and an outwardly extended portion forming a hollow trunnion, a vaned feed section detachably connected to the drum opposite said end wall; said feed section serving as an inlet chute or spout and having a plurality of arms connected to an axial hub, supporting means for said trunnions, means for rotating the drum; said drum including integral ribs extending the full length of the same, a series of grid plates having spaces longitudinally of the drum through which the crushed material may pass removably mounted between said ribs, inclined shelves extending the full length of the drum internally thereof and supported by the end wall for lifting material delivered to the drum, hammer mechanism comprising a hammer-carrying rotor and a supporting shaft therefor concentrically disposed with respect to said drum for acting upon material spilling from said shelves, means for mounting said shaft independently of the drum, and means for driving the same independently of the means for imparting movement to the drum.

4. In a crushing structure of the type described, a cylindrical drum rotatably mounted having a peripheral wall made up of an imperforate section and a foraminous section composed of a plurality of screen plates or grids detachably mounted; said foraminous wall section having an opening formed by the omission of one of said screen plates or grids, and a guard for such opening carried by the wall of the drum internally of the same to prevent crushed material cascading therethrough.

GEORGE W. BORTON.